(12) United States Patent
Schneider-Hufschmidt et al.

(10) Patent No.: US 6,385,313 B1
(45) Date of Patent: May 7, 2002

(54) COMMUNICATION TERMINAL CONTROL

(75) Inventors: Matthias Schneider-Hufschmidt; Anton Obermaier, both of München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/254,912

(22) PCT Filed: Aug. 26, 1997

(86) PCT No.: PCT/DE97/01855

§ 371 Date: Mar. 16, 1999

§ 102(e) Date: Mar. 16, 1999

(87) PCT Pub. No.: WO98/12854

PCT Pub. Date: Mar. 26, 1998

(30) Foreign Application Priority Data

Sep. 16, 1996 (DE) .......................... 196 37 719

(51) Int. Cl.⁷ .................... H04M 1/2745; H04M 3/42
(52) U.S. Cl. .................. 379/216.01; 379/355.05; 379/355.1
(58) Field of Search ................. 379/201, 207, 379/209, 216, 355, 356, 357, 201.1, 201.02, 201.03, 201.05, 201.09, 216.01, 355.01, 355.02, 355.03, 355.04, 356.01, 357.01, 355.09, 355.1, 209.01; 340/825.22, 355.05

(56) References Cited

U.S. PATENT DOCUMENTS

| 4,453,040 | A | | 6/1984 | Wolf et al. ................ 379/355 |
| 4,972,183 | A | * | 11/1990 | Kuhlmann et al. ..... 340/825.22 |
| 5,206,904 | A | | 4/1993 | Koma ...................... 379/355 |
| 5,568,545 | A | * | 10/1996 | Vesterinen .............. 379/230 X |

FOREIGN PATENT DOCUMENTS

| DE | 44 25 604 A1 | 2/1996 | ............ H04M/1/00 |
| EP | 0 639 017 A2 | 2/1995 | ............ H04M/1/00 |
| GB | 2 262 630 A | 6/1993 | ......... G06F/15/403 |
| GB | 2 291 563 A | 1/1996 | .......... H04M/1/274 |

* cited by examiner

Primary Examiner—Harry S. Hong
(74) Attorney, Agent, or Firm—Bell, Boyd & Lloyd LLC

(57) ABSTRACT

A method for controlling a communications terminal in which control instructions can be called from an instruction memory wherein, the control instructions have, at least to a certain extent, individually callable control instruction components such that a freely selectable sequence of control instruction components can be stored under names, and held ready for a call.

3 Claims, 2 Drawing Sheets

FIG 2

| | | |
|---|---|---|
| Component | 1 | Interrogate PIN |
| | 2 | Interrogate call number |
| | 3 | Actuate signal key |
| | 4 | Pause |
| | 5 | Interrogate acknowledgment |
| | 6 | Wait for exchange |
| | 7 | Actuate internal key |
| | 8 | Actuate set key |
| | 9 | Redial |
| | 10 | Contact exchange |
| | 11 | Release exchange |
| | 12 | Output signal tone |
| | 13 | Switch off unit |
| | 14 | Separating symbol |
| | 15 | Switch on temporary tone dialing |

COMMUNICATION TERMINAL CONTROL

BACKGROUND OF THE INVENTION

1. Field of the Invention

The present invention relates, generally, to a method for controlling a communications terminals in which control instructions can be called from an instruction memory and, more particularly, to a method wherein the control instructions have individually callable control instruction components such that a freely selectable sequence of such components can be stored and retrieved.

2. Description of the Prior Art

Such communications terminals are, for example, added-feature telephones (with or without telephone answering machines), the telephone answering machines themselves, fax machines, and cordless or mobile telephones. These communications terminals have an entire series of components which has to be set and controlled by a user. These components include, for example, the terminal itself, a base station in the case of cordless telephones, externally provided services in the telecommunications network and, a telephone answering machine which is to be interrogated from an external telephone.

The control of the components of the communications terminal is, as a rule, carried out by means of a dialing keypad. By actuating a key on the dialing keypad, signals are actuated using the multi-frequency method. Functions, which also can be represented on a display, are triggered by means of these signals. The number of possible signals is predefined by the number and the assignment of the keys on the given dialing keypad.

When the communications terminal itself, or an associated base station, is set, signals are used to call functions which cannot be entered via a standard dialing keypad.

In the case of control signals which are transmitted to external devices via a trunk line, the user has, as a rule, no further influencing possibilities apart from a manually insertable pause whose duration can be defined.

In the case of communications terminals with a telephone directory register or with programmable function keys, the user can store the necessary control instructions on these function keys or in the register. The user is restricted here to the characters which can be stored in the corresponding registers. In addition, after the calling and transmission of the corresponding register contents, the user no longer has any influence on the execution of the control sequence and, thus, on the execution of the function. With this type of storage of the control signals, the user cannot integrate variable call numbers or personal identification numbers into the control sequence and/or into the control instructions during the execution. For variable call numbers and identification numbers it is then necessary to assign two function keys for the execution of a function. For the first function key, the control sequence is executed up to the necessary entry of a variable call number or an identification number. With the second function key, the rest of the control sequence is executed after the entry of the number.

The present invention is therefore directed toward specifying a method of the type mentioned at the beginning by means of which the user-friendliness of the communications terminal is increased.

SUMMARY OF THE INVENTION

Accordingly, in an embodiment of the present invention, a method is provided for controlling a communications terminal in which control instructions can be called from an instruction memory, wherein the method includes the steps of: providing individually callable control instruction components for each control instruction; storing a freely selectable sequence of the control instruction components for each control instruction under a name; and holding the freely selectable sequence of the control instruction components ready for a call.

In an embodiment, the method further includes the step of selecting the name from a list of names for the call.

In an embodiment, the method further includes the step of assigning the name to a function key wherein the name is selected via actuation of the function key for the call.

Additional features and advantages of the present invention are described in, and will be apparent from, the Detailed Description of the Preferred Embodiments and the Drawings.

DESCRIPTION OF THE DRAWINGS

FIG. 2 shows a number of control-instruction components in accordance with the teachings of the present invention.

DETAILED DESCRIPTION OF THE PREFERRED EMBODIMENTS

Figure 1:
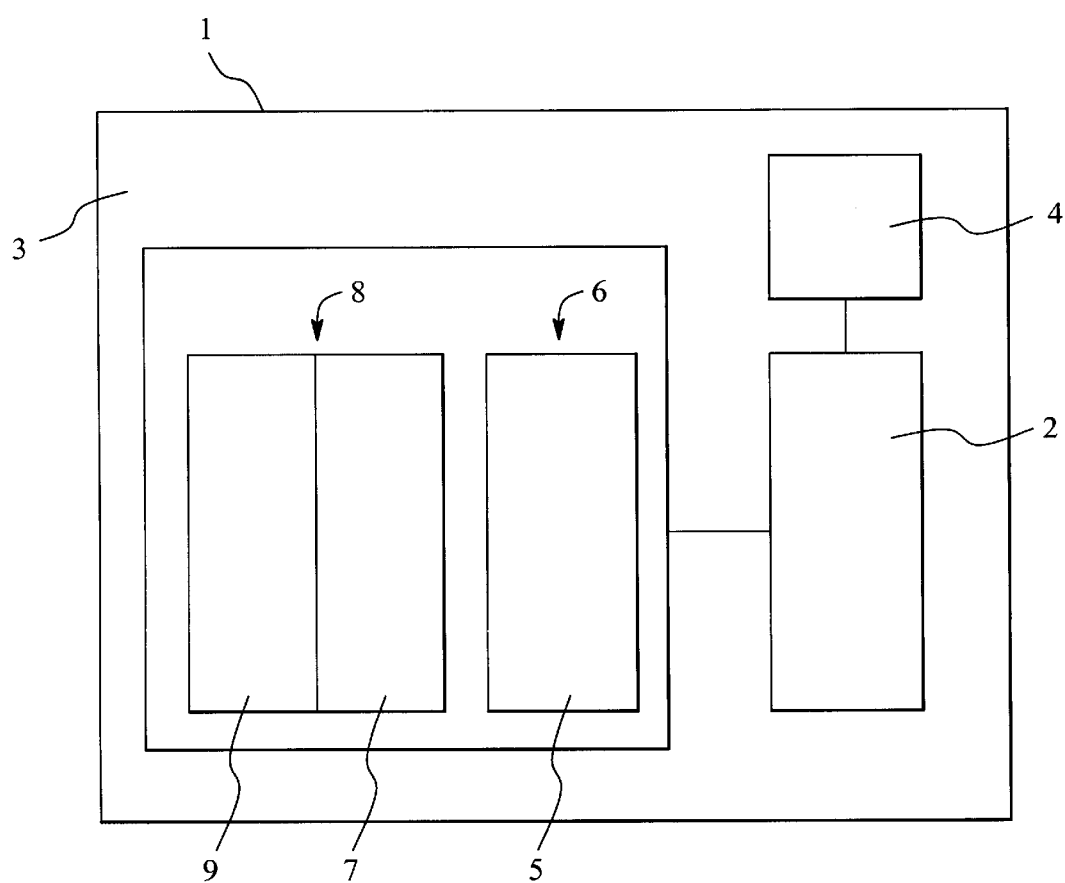
FIG. 1 shows a block circuit diagram of a communications terminal in accordance with the teachings of the present invention.

The block circuit diagram of a communications terminal KE in FIG. 1 shows the circuit blocks which are important to an understanding of the present invention.

The communications terminal 1 has a main processor 2 which is itself connected to an instruction memory 3 in order to control the communications terminal 1. The communications terminal 1 is illustrated in the drawing as a single circuit block, but functionally it may have individual components, such as, a base station and a mobile part. Connected to the main processor 2 is a keypad block 4 via which, depending on the design of the keypad block 4, numbers and/or letters may be entered, and the corresponding functions may be triggered using function keys.

According to the present invention, the control instructions for controlling the communications terminal 1 are divided, at least to a certain extent, into control instruction components 5. These control instruction components 5 are stored in an instruction list 6 in the instruction memory BS. In order to implement a conventional control instruction, one or more control instruction components 5 must be combined when the control method of the invention is used. In order to implement a control instruction when using the inventive method, one or more control instruction components 5 must be combined, possibly with one or more signals generated by the dialing keys or function keys of the keypad block 4.

A list of possible control instruction components 5 is given in FIG. 2. Depending on the equipment, this list can be expanded by further control instruction components 5, and/or it is possible to refrain from using some of these components SK. These control instruction components 5 and/or the associated signals can be called, for example, by means of the dialing keypad and fixed function keys of the keypad block 4. Here, a plurality of control instruction components 5 may be assigned to one signal which can be called by means of a key.

The user of the communications terminal 1 can form a self-dialable sequence from these control instruction components 5 and from the signals generated by the dialing keypad or fixed function keys. These sequences are designated as macros 7 which already are known from software systems. The selected control instruction components 5 are combined as macro 7. All the macros 7 defined by the user are combined and stored in a macro list 8. In order to find the individually combined sequence of control instruction components 5 again, each macro 7 is given a name 9. The names 9 and macros 7 which are assigned to one another are stored in the macro list 8. By calling a name 9, the associated control instruction components 5 of the macro 7 are actuated and the associated individual functions are executed.

In the method according to the present invention, the user may control his communications terminal 5 and/or its components by means of these macros 7.

A name 9 and/or the associated macro 7 also can be assigned to a programmable function key. If this function key is actuated by the user, the function which is predefined by the macro 7 is executed. If a command is detected when a macro or a sequence of control instruction components 5 is being processed, the corresponding action is initiated. This is, for example, the interrogation of a destination number of a variable call diversion, the interrogation of a personal identification number, or the waiting for an explicit confirmation of the user.

Although the present invention has been described with reference to specific embodiments, those of skill in the art will recognize that changes may be made thereto without departing from the spirit and scope of the invention as set forth in the hereafter appended claims.

What is claimed is:

1. A method for controlling a communications terminal in which control instructions can be called from an instruction memory, the method comprising the steps of:

provide individually callable control instruction components for each control instruction;

storing a freely selectable sequence of the control instruction components for each control instruction under a name; and holding the freely selectable sequence of the control instruction components ready for a call.

2. A method for controlling a communications terminal as claimed in claim 1, further comprising the step of:

selecting the name from a list of names for the call.

3. A method for controlling a communications terminal as claimed in claim 1, further comprising the step of assigning the name to a function key wherein the name is selected via actuation of the function key for the call.

* * * * *